US005750260A

United States Patent [19]
Ryther

[11] Patent Number: 5,750,260
[45] Date of Patent: May 12, 1998

[54] DEVELOPMENT/TRANSPORT ROLLERS HAVING A FLUOROCARBON COATING FOR USE IN AUTOMATED THERMAL DEVELOPMENT EQUIPMENT

[75] Inventor: Robert James Ryther, St. Paul, Minn.

[73] Assignee: Imation Corp, Oakdale, Minn.

[21] Appl. No.: 755,265

[22] Filed: Nov. 22, 1996

[51] Int. Cl.$^6$ ........................................... B32B 27/00
[52] U.S. Cl. ........................ 428/421; 428/422; 428/447; 428/913; 492/56; 492/59
[58] Field of Search ........................ 428/421, 422, 428/447, 913; 430/99, 124; 492/56, 59

[56] References Cited

U.S. PATENT DOCUMENTS

| | | |
|---|---|---|
| 2,764,602 | 9/1956 | Ahlbrecht. |
| 3,986,993 | 10/1976 | Vassiliou ............................. 260/23 X |
| 4,171,397 | 10/1979 | Morrow. |
| 4,566,938 | 1/1986 | Jenkins et al. ........................ 156/643 |
| 4,636,451 | 1/1987 | Matkin et al. ........................ 430/109 |
| 4,793,041 | 12/1988 | Jenkins et al. ........................ 29/121.1 |
| 4,810,564 | 3/1989 | Takahashi. |
| 4,949,132 | 8/1990 | Chimoto. |
| 4,975,363 | 12/1990 | Cavallo. |
| 5,008,135 | 4/1991 | Giordano et al. ........................ 427/386 |
| 5,468,603 | 11/1995 | Kub. |
| 5,532,121 | 7/1996 | Yonkoski. |
| 5,550,273 | 8/1996 | Savu. |

*Primary Examiner*—William Krynski
*Attorney, Agent, or Firm*—Arlene K. Musser

[57] ABSTRACT

A heated development/transport roller having improved film release properties is provided by applying a fluorocarbon coating on the outer surface of the roller. The fluorocarbon coating may be applied onto the resilient layer surface of the roller by simply wiping a solution of the fluorocarbon material onto the resilient layer surface. There is no need for special coating conditions nor any post thermal curing or fusing conditions. The solvent is removed by application of heat either from the heating means of the roller or from an external heating source. The fluorocarbon coating provides improved film release and transport characteristics especially when applied to a hot silicone coated aluminum roller.

12 Claims, No Drawings

DEVELOPMENT/TRANSPORT ROLLERS HAVING A FLUOROCARBON COATING FOR USE IN AUTOMATED THERMAL DEVELOPMENT EQUIPMENT

FIELD OF THE INVENTION

This invention relates to transport/development roller(s) and a method for using the roller(s) in an automated imaging device for processing heat-developed films. In particular, it relates to the use of a fluorocarbon coating applied to the outer surface of a resilient layer on the roller(s) to assist in transportation and removal of films in the imaging device.

BACKGROUND OF THE INVENTION

The increasing availability and use of semiconductor light sources, such as laser diodes which emit in the visible and particularly in the red and infrared region of the electromagnetic spectrum, have led to the development of heat-developable elements (i.e., photothermographic films) that have the ability to be efficiently exposed by laser imagesetters, light emitting diodes, or laser imagers and which have the ability to form sharp images of high resolution and sharpness. In addition, the semiconductor light sources have allowed the design of compact automated equipment which increases the productivity of the imaging process, especially in medical diagnostic and graphic arts applications. Unlike conventional photographic imaging processes, photothermographic elements are developed with heat. The use of heat-development eliminates the use of wet processing chemicals which provides a simpler, environmentally friendly system.

In photothermographic imaging elements, a visible image is created by heat as a result of the reaction of a developer incorporated within the imaging element. Heat is essential for development and temperatures of over 100° C. are routinely required. In contrast, conventional wet-processed photographic imaging elements require processing in aqueous processing baths to provide a visible image (e.g., developing and fixing baths) and development is usually performed at a more moderate temperature (e.g., 30°–50° C.). Because photothermographic elements are processed thermally, the design and use of the processing equipment require different considerations and present distinctly different problems.

For example, if the films stick to the silicone coated transport/development roller(s) or heated drum (or belt) either through static attraction or adhesion to the roller surface, it causes operational failure of the apparatus and can potentially damage internal mechanisms within the apparatus. At best, an operator has to open the apparatus to clear the jam, thereby resulting in loss of productivity which defeats the purpose of an automated system.

Limited success has been made to alleviate this problem through product design of the heat-developable media, such as incorporation of slip agents and/or particulates into the outer coating surface of the films. U.S. Pat. No. 5,468,603, for example, describes a photothermographic film having incorporated in the back-side coating polymeric beads to assist in transportation of the film through automated equipment. Because of the continuous motion of the films and their propensity for generating static coupled with the softening of the coated films due to the temperatures required to develop the latent image, the films still have a tendency to adhere to the development roller surface. Instead of releasing at the proper time in the processing cycle, the film continues to adhere to the silicone surface destroying the film and breaking the processor cycling, thus requiring operator intervention. This is particularly annoying in automated equipment, where the need for operator intervention defeats the purpose of automation.

U.S. Pat. Nos. 4,949,132 and 4,810,564 describe a heat fixing device for use in a photocopier to fuse a toner image to paper. The heat fixing device comprises a silicone coated aluminum tube where a fluorocarbon resin coating is applied to the surface of the silicone. The fluorocarbon resin is applied to the silicone surface either electrostatically or spray coated and then fused onto the silicone using temperatures between 350° C. and 400° C. to bond the fluorine resin to the silicone rubber layer. Both methods require the application of the fluorocarbon resin to the fuser roller separate from the device. The fluorocarbon coating can not be effectively applied while the roller is installed in the device.

There still remains a need for thermal development/transport roller(s) whereby heat-developable coated films do not adhere to the surface of the roller causing equipment malfunctions. In addition, there is a need for a release coating that can be applied to the development roller simply and conveniently without the need for special coating conditions or post curing or fusing conditions and no need to dismantle the thermal processing equipment.

SUMMARY OF THE INVENTION

The present invention provides a heat development/transport roller comprising a metal support tube, a means for heating the roller either attached to the inner surface of the tube or housed within the core of the tube, a resilient layer on the outer surface of the tube, and a thin fluorocarbon coating on the surface of the resilient layer, where the fluorocarbon coating comprises a fluorocarbon material including an ammonium salt derivative of a perfluoroalkyl sulfonamide or an ammonium salt derivative of a perfluoroalkyl sulfonate.

Another embodiment of the present invention provides a method for preparing a releasable development/transport roller for use in a thermal processor comprising the steps of: (a) providing a heated development/transport roller comprising (i) a rotatable metal support tube having an inner surface and an outer surface; (ii) a means for heating the roller attached to the inner surface of the tube or housed within the core of the tube; and (iii) a resilient layer deposited on the outer surface of the metal tube; (b) applying a fluorocarbon solution onto the resilient layer, wherein the fluorocarbon solution comprises a solvent and a fluorocarbon material; and (c) removing the solvent with heat.

The fluorocarbon coating may be applied onto the resilient layer surface by simply wiping a solution of the fluorocarbon material onto the resilient layer surface. There is no need for special coating conditions nor any post thermal curing or fusing conditions. The solvent is removed by application of heat either from the heating means of the roller or from an external heating source. The fluorocarbon coating provides improved film release and transport characteristics especially when applied to a hot silicone coated aluminum roller.

"Development/transport roller(s)" herein refers to heated rollers, drums and continuous belts used to transport and develop heat-developable imaging films. Heat-developable films include coated films bearing a latent image that is developed through the application of heat.

DETAILED DESCRIPTION OF THE INVENTION

Thermally developed imaging films, such as those described in U.S. Pat. Nos. 5,434,043; 5,563,030; 5,536, 622; 5,558,983; 5,545,505; 5,405,740; and 5,468,603, are normally developed by placing the imagewise exposed film in contact with a plurality of heated rotatable rollers or a heated rotatable drum. Imagewise exposed films in sheet form are typically biased against the heated rollers or heated drum by means of rotatable guiding rollers or a fixed curved platen. Whereas, imagewise exposed films in web form do not require the use of any guiding device to bring the imaged film in contact with the development roller. The development conditions will vary depending on the construction used, but will typically involve heating the imagewise exposed material at a suitably elevated temperature, e.g. from about 80° C. to about 250° C.; preferably, from about 120° C. to about 200° C., for a sufficient period of time, generally from 1 second to 2 minutes.

Heat development rollers used in these applications generally include a metal (e.g. aluminum) support tube with a resilient layer applied to the outer surface of the tube and a heating means attached to the inner surface of the tube (e.g. heater blanket) or housed within the core of the tube. The resilient layer typically comprises materials such as silicone rubbers, silicone blends, or neoprenes which are well known in the art to provide durability as well as release characteristics. Generally, any resilient layer designed for heated roller applications may be used.

Even though most resilient coatings in general provide excellent release properties and durability, release of heat-developed imaging films from silicone coated hot development rollers or heated drums have in experience failed on numerous occasions. Applicant has discovered that the application of a fluorocarbon coating onto the surface of a heated silicone coated development/transport roller(s) or drum provides improved release of heat-developed imaging films as compared to silicone coated rollers absent such additional outer surface coating. The application of the fluorocarbon coating significantly lowers the surface energy of the silicone hot roller to provide better film release and transport characteristics leading to reduced processing failure.

Suitable fluorocarbon coatings include ammonium salt derivatives of perfluoroalkyl sulfonamides, such as those described in U.S. Pat. No. 2,764,602, incorporated herein by reference, or ammonium salt derivatives of perfluoroalkyl sulfonates such as those described in U.S. Pat. No. 4,975,363, incorporated herein by reference.

Preferred ammonium salt derivatives of perfluoroalkyl sulfonamides include perfluoroalkyl-amidopolymethylene quaternary nitrogen compounds having the general formula:

[F(CF$_3$)$_n$—CO—NH—(CH$_2$)$_m$NRR$^1$R$^2$]$^+$A$^-$ where n is equal to an integer value of 3 to 11; m is equal to an integer value of 2 to 6; R, R$^1$, R$^2$ are hydrocarbon groups, such as alkyl, cyclohexyl, alkaryl and aryl groups, preferred R is stable oleophilic hydrocarbon group, such as an alkyl, cycloalkyl, alkaryl, aryl or aralkyl group, containing 1 to 17 carbon atoms, R$^1$ and R$^2$ are alkyl groups each containing 1 to 6 carbon atoms; and A is an anion, such as a halogen anion (fluorine, chlorine, bromine or iodine), a sulfate ion, and hydroxyl anion;

Preferred ammonium salt derivatives of perfluoroalkyl sulfonates include polyoxyalkylene amine perfluoroalkyl sulfonates having the general formula:

[H$_3$N—R—NH$_3$]$^{+2}$[R$_f$SO$_3$]$^{-2}$ where R is a peroxyalkylene based on propylene oxide, ethylene oxide or mixtures thereof; and R$_f$ is selected from the group consisting of perfluorinated alkyl groups having from 1 to 10 carbon atoms, partially-fluorinated alkyl groups having from 1 to about 10 carbon atoms, unsubstituted or perfluoroalkyl-substituted perfluorocycloalkyl groups having from 4 to about 8 carbon atoms, and unsubstituted or perfluoroalkyl-substituted, partially-fluorinated cycloalkyl groups having from 4 to about 8 carbon atoms. One could conceivable use peroxyalkylene mono- and tri-amines as well.

A more preferred polyoxyalkylene amine fluorocarbon sulfonate material has the following structure A and can be prepared using the general procedure described in U.S. Pat. No. 4,975,363:

[H$_3$NCH(CH$_3$)CH$_2$(OCH$_2$CH(CH$_3$))$_a$(OCH$_2$CH$_2$)$_b$-(OCH$_2$CH(CH$_3$))$_c$NH$_3$]$^{+2}$

[C$_8$F$_{17}$SO$_3$]$^{-2}$

A wherein b=8.5 and a+c=2.5.

The fluorocarbon material is applied to the resilient layer of the roller or drum using a solution of the fluorocarbon material suspended in a suitable polar solvent, such as water, ketones, acetates, alcohol, etc. The solution may be applied by simply swabbing the solution onto the resilient layer surface and wiping off any excess to form a very thin coating over the surface. Solutions containing 1.0%, 0.1% and 0.01% by weight of fluorocarbon material (having the structure A described above) were used to coat a silicone surface of a development/transport drum of a thermal processor described in U.S. patent application Ser. No. 08/239,709 (published in International patent application WO 95/30934), incorporated herein by reference. The fluorocarbon coating was applied by simply wiping the surface of the roller with a solution soaked cloth. The heat of the roller was sufficient to drive-off the solvent to provide a dry thin coating on the surface of the roller. It is understood by one skilled in the art that one could also drive-off the solvent using an external heat source as well. All of the coatings showed equivalent surface energy characteristics of about 10–20 dynes/cm. The silicone surface prior to coating with the fluorocarbon material had a surface energy of approximately 30 dynes/cm. All of the fluorocarbon coatings provided acceptable release of a photothermographic film from the hot development/transport drum. The heated drum retained its release properties as long as the fluorocarbon coating was present. Cycle count tests showed that the release properties were retained on the fluorocarbon coated drum for over 10,000 cycles with no misfeeds or jams in the thermal processor. Whereas, the silicone coated drum without the applied fluorocarbon surface coating provided no release of the film and consequently jammed the thermal processor.

The polyoxyalkylene amine perfluoroalkyl sulfonate coatings could be detected by using x-ray fluorescence spectroscopy as well as secondary ion mass spectroscopy; however, the coatings were too thin to determine a reliable thickness. The actual thickness is not critical so long as sufficient material is present to provide suitable releasing properties of the heat-developable film. Thicker coatings may be applied, but it is not necessary for acceptable performance. Since the coating may be conveniently and easily re-applied at will, very thin coatings may be used to avoid any potential contaminant build-up in the thermal processor. Contaminant build-up may be of particular concern if the thermal processor is part of an integrated imaging system which includes a laser scanner due to detrimental effects on performance of the optics. A preferred thickness of the fluorocarbon coating is less than 10 microns, more preferred less than 5 microns, most preferred less than 1 micron.

Once the fluorocarbon coating is exhausted, it can be easily re-applied by wiping the surface with additional fluorocarbon solution without dismantling the thermal processor. Even though the fluorocarbon coating is non-permanent, any transfer of the material onto the photothermographic film presents no detrimental effects on the film due to the inert characteristics of the fluorocarbon material.

Although the preferred fluorocarbon materials in the present invention are generally known to be good antistats, the improved release properties observed do not appear to be static related. No static electric buildup was observed at any time during the processing cycle in the thermal processor. It is believed that the fluorocarbon material enhances the release characteristics of the hot silicone surface.

Preferably, the surface of the underlying resilient layer is sufficiently smooth to minimize the formation of patterns on the thermally developed imaging film. A surface roughness of not more than 250 microinches (6.3 micrometers) is preferred, and more preferably not more than 125 microinches (3.2 micrometers). Preferably, the thermal conductivity of the resilient layer is sufficient to maintain a uniform temperature on the surface of the heated development roller to allow for a practical throughput rate and quick heat-up time. A resilient layer having a thermal conductivity equal to or greater than 4 BTU-inch/hr-ft$^2$-°F. (0.59 Watts cm$^2$-°C.) is preferred. The thickness of the resilient layer is preferably between 0.025 and 0.40 inch (0.64 and 1.0 mm), more preferably between 0.027 and 0.033 inch (0.69 and 0.84 mm). In addition, the durometer of the resilient layer is chosen such that foreign particles trapped between the heat developed imaging film and the heated roller do not cause nonuniform development of the image. A preferred Shore A durometer range is between 45–95, more preferably between 50–85, most preferably between 55–75.

Reasonable variations and modifications are possible from the foregoing disclosure without departing from either the spirit or scope of the present invention as defined in the claims.

What is claimed is:

1. A heated development/transport roller comprising
   (a) a rotatable metal support tube having an inner surface and an outer surface;
   (b) a means for heating said roller attached to said inner surface of said tube or housed within the core of said tube;
   (c) a resilient layer deposited on said outer surface of said metal tube; and
   (d) a fluorocarbon coating adjacent to said resilient layer, wherein said fluorocarbon coating comprises a fluorocarbon material selected from the group consisting of ammonium salt derivatives of perfluoroalkyl sulfonamides and ammonium salt derivatives of perfluoroalkyl sulfonates.

2. The development/transport roller of claim 1 wherein said fluorocarbon material is represented by the general formula:

$$[H_3N-R-NH_3]^{+2}[R_fSO_3]^{-2}$$

where R is a peroxyalkylene based on propylene oxide, ethylene oxide or mixtures thereof; and $R_f$ is selected from the group consisting of perfluorinated alkyl groups having from 1 to 10 carbon atoms, partially-fluorinated alkyl groups having from 1 to about 10 carbon atoms, unsubstituted or perfluoroalkyl-substituted perfluorocycloalkyl groups having from 4 to about 8 carbon atoms, and unsubstituted or perfluoroalkyl-substituted, partially-fluorinated cycloalkyl groups having from 4 to about 8 carbon atoms.

3. The development/transport roller of claim 1 wherein said fluorocarbon material is represented by the formula:

$$[H_3NCH(CH_3)CH_2(OCH_2CH(CH_3))_a(OCH_2CH_2)_b\text{-}(OCH_2CH(CH_3))_cNH_3]^{+2}$$

$$[C_8F_{17}SO_3]^{-2}$$

wherein b=8.5 and a+c=2.5.

4. The development/transport roller of claim 1 wherein said resilient layer is a silicone rubber and said support tube is aluminum.

5. A method for preparing a releasable development/transport roller for use in a thermal processor comprising the steps of:
   (a) providing a heated development/transport roller comprising
      (i) a rotatable metal support tube having an inner surface and an outer surface;
      (ii) a means for heating said roller attached to said inner surface of said tube or housed within the core of said tube; and
      (iii) a resilient layer deposited on said outer surface of said metal tube;
   (b) applying a fluorocarbon solution onto said resilient layer, wherein said fluorocarbon solution comprising a solvent and a fluorocarbon material; and
   (c) removing said solvent with heat.

6. The method of claim 5 wherein said fluorocarbon material is selected from the group consisting of ammonium salt derivatives of perfluoroalkyl sulfonamides and ammonium salt derivatives of perfluoroalkyl sulfonates.

7. The method of claim 5 wherein said fluorocarbon material is represented by the general formula:

$$[H_3N-R-NH_3]^{+2}[R_fSO_3]^{-2}$$

where R is a peroxyalkylene based on propylene oxide, ethylene oxide or mixtures thereof; and $R_f$ is selected from the group consisting of perfluorinated alkyl groups having from 1 to 10 carbon atoms, partially-fluorinated alkyl groups having from 1 to about 10 carbon atoms, unsubstituted or perfluoroalkyl-substituted perfluorocycloalkyl groups having from 4 to about 8 carbon atoms, and unsubstituted or perfluoroalkyl-substituted, partially-fluorinated cycloalkyl groups having from 4 to about 8 carbon atoms.

8. The method of claim 5 wherein said fluorocarbon material is represented by the formula:

$$[H_3NCH(CH_3)CH_2(OCH_2CH(CH_3))_a(OCH_2CH_2)_b\text{-}(OCH_2CH(CH_3))_cNH_3]^{+2}$$

$$[C_8F_{17}SO_3]^{-2}$$

wherein b=8.5 and a+c=2.5.

9. The method of claim 5 wherein said resilient layer is a silicone rubber and said support tube is aluminum.

10. A heated development/transport roller comprising
   (a) a rotatable metal support tube having an inner surface and an outer surface;
   (b) a means for heating said roller attached to said inner surface of said tube or housed within the core of said tube;
   (c) a resilient layer deposited on said outer surface of said metal tube; and (d) a fluorocarbon coating having a thickness less than 10 microns adjacent to said resilient layer, wherein said fluorocarbon coating comprises a fluorocarbon material selected from the group consisting of ammonium salt derivatives of perfluoroalkyl sulfonamides and ammonium salt derivatives of perfluoroalkyl sulfonates.

11. The heated roller of claim 10 wherein said thickness of said fluorocarbon coating is less than 5 microns.

12. The heated roller of claim 10 wherein said thickness of said fluorocarbon coating is less than 1 micron.

\* \* \* \* \*